United States Patent
Gehri

[11] 3,900,116
[45] Aug. 19, 1975

[54] FUEL ELEMENT SHIPPING SHIM FOR NUCLEAR REACTOR

[75] Inventor: Aime Gehri, Richland, Wash.

[73] Assignee: Exxon Nuclear Company, Inc., Richland, Wash.

[22] Filed: Sept. 5, 1972

[21] Appl. No.: 286,113

[52] U.S. Cl. ........ 214/10.5 R; 105/369 S; 206/65 R; 214/152
[51] Int. Cl. ............................................. B65g 1/14
[58] Field of Search ....... 229/42 R; 206/65 R, 65 Y; 105/369 S, 369 R, 369; 214/10.5 R

[56] References Cited
UNITED STATES PATENTS

| | | | |
|---|---|---|---|
| 1,519,901 | 12/1924 | Boaz et al. | 214/10.5 R |
| 1,876,758 | 9/1932 | Romine | 105/369 UC |
| 2,062,948 | 12/1936 | Swank et al. | 214/10.5 R X |
| 3,223,234 | 12/1965 | Weiss | 206/65 R |
| 3,306,439 | 2/1967 | Storey | 206/65 Y |
| 3,373,540 | 3/1968 | Wisner | 214/10.5 R X |

Primary Examiner—Frank E. Werner
Attorney, Agent, or Firm—F. Donald Paris

[57] ABSTRACT

A shim for use in the transportation of nuclear reactor fuel assemblies comprising a member preferably made of low density polyethylene designed to have three-point contact with the fuel rods of a fuel assembly and being of sufficient flexibility to effectively function as a shock absorber. The shim is designed to self-lock in place when associated with the fuel rods.

14 Claims, 4 Drawing Figures

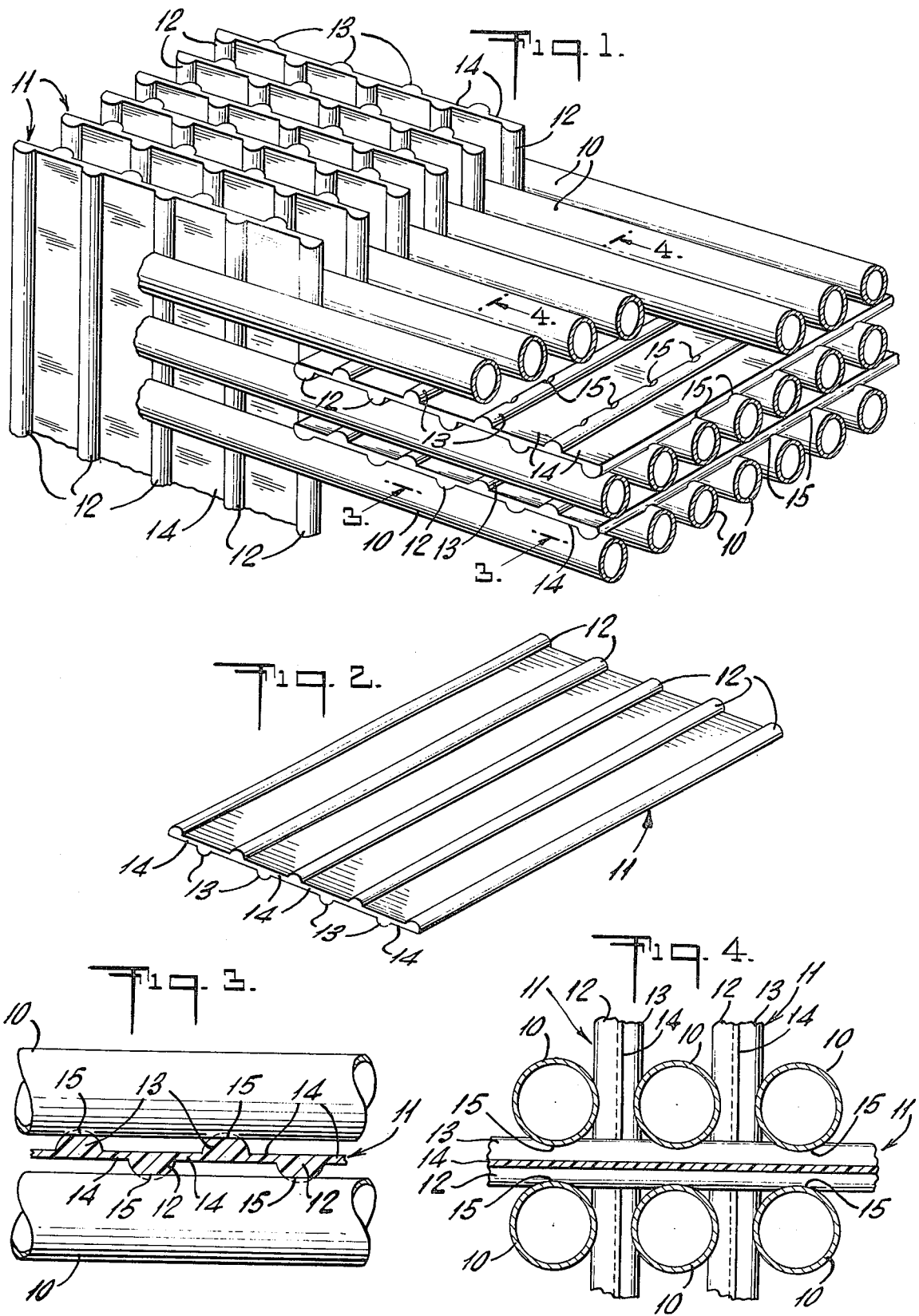

ELEMENT SHIPPING SHIM FOR NUCLEAR REACTOR

BACKGROUND OF THE INVENTION

In the shipment of nuclear reactor fuel assemblies to customers, it is necessary to provide a member between the fuel elements or rods to prevent them from flexing during transportation. Shipping shims previously employed essentially comprise a machined nylon block having two drilled holes. These members are placed between parallel rows of the fuel elements and a nylon wire is passed through the holes to secure the shims in place. Conventional shims have been designed in accordance with the spacing between parallel fuel rods for each fuel assembly and, accordingly, cannot accommodate a change in the spacing without necessarily having to design a new shim. Thus, if the space is relatively wide the shims designed for a smaller spacing will be loose, and if the space is relatively small, shims designed for a larger space must be forced into place between the fuel rods, which may cause damage in flexing the fuel elements.

SUMMARY OF THE INVENTION

To overcome the foregoing deficiencies and disadvantages of prior art shims used in the shipment of nuclear reactor fuel assemblies, in a preferred embodiment of this invention there is provided a relatively flexible shim made of low density polyethylene, which provides three-point contact between the rods. Such contact is obtained regardless of the spacing between the parallel rows of the fuel rods. The shim comprises an elongated member of suitable width and having a plurality of alternately spaced raised portions or ridges on each side of the shim extending in a uniform direction. The ridges are connected by webs. The shim has the necessary flexibility to adapt to any deviation, while retaining a certain degree of stiffness necessary to provide a good shock absorbing medium. The shim is constructed so that it will self-lock in place between the fuel rods, thus eliminating the need for any external securing members such as the nylon wires employed in the prior art.

Accordingly, it is a primary object of the present invention to provide a novel and improved shim for use in the transportation of nuclear reactor fuel assemblies.

A further object of the present invention is to provide a novel and improved shim for use in the transportation of nuclear reactor fuel assemblies, wherein the shim acts as a shock absorber and self-locks in place.

Still yet a further object of the present invention is to provide a flexible shim for use in the transportation of nuclear reactor fuel assemblies, which is economical to manufacture and is operable regardless of the spacing between rows of fuel elements.

Having in mind the above and other objects and advantages that will be apparent from an understanding of this disclosure, the present invention comprises the construction and arrangements as illustrated in the presently preferred embodiment of this invention, which is hereinafter set forth in such detail as to enable those skilled in the art readily to understand the function, operation, construction and advantages of it when read in conjunction with the accompanying drawings.

BRIEF DESCRIPTION OF THE DRAWINGS

FIG. 1 discloses a perspective view of shims constructed according to the present invention arranged in a typical nuclear reactor fuel assembly;

FIG. 2 illustrates a perspective view of shims constructed according to the present invention;

FIG. 3 illustrates a sectional view taken substantially along the line 3—3 of FIG. 1; and FIG. 4 illustrates a cross section view taken substantially along the line 4—4 of FIG. 3.

DESCRIPTION OF THE PREFERRED EMBODIMENT

Having reference to the drawing wherein like parts are designated by the same reference numeral throughout the several views, the present invention is illustrated in FIG. 1 as embodied in a typical conventional fuel assembly for a nuclear reactor (e.g., see U.S. Pat. No. 3,431,170, J. L. Lass et al. The fuel assembly essentially comprises a parallel array of fuel rods or elements 10 held in place between upper and lower tie plates (not shown) and suitable grid spacers (not shown) disposed between the tie plates. Because of the fact that these fuel rods typically have a substantial length, it is necessary to provide the grid spacers in order to maintain them in their desired parallel disposition within the fuel assembly. The distance between fuel rods typically may range from 0.075 to 0.250 inches, and the overall length of the fuel assembly typically may range from 4 to 14 feet.

As illustrated in FIG. 1, a plurality of shims 11 are interposed between parallel rows of the fuel rods 10. To provide the desired rigidity for the rods during shipment of the fuel assembly, these shims are alternately disposed perpendicular to each other to prevent undesirable flexing by the rods in all directions. The particular width of each shipping shim may be designed according to the distance between the grid spacers. While the exact width of each shim is not critical, it is important that the width be such so that when they are positioned between the parallel rows of rods between adjacent grid spacers, they provide sufficient rigidity (i.e., prevent flexing) for the rods during transportation of the fuel assembly. It is necessary that the shims act as shock absorbers and essentially hold the fuel rods in place during transportation, by relieving all pressure from the spacer dimples which easily may collapse under too much shock or pressure. By positioning the shims in alternating parallel arrays disposed perpendicular to each other, the foregoing objectives are accomplished. Regardless of the spacing between the fuel elements, since the shims are made of a flexible material such as low density polyethylene, they will accommodate various different spacing between parallel rods, within certain limits.

The shim constructed according to the present invention comprises alternating upper and lower ridges 12 and 13. While the shim is made preferably from a low density polyethylene, any suitable material having the characteristics of Durometer hardness and cleanliness will be satisfactory. Other suitable materials may include nylon and polymer. As best shown in FIG. 2, the ridges are interconnected by web portions 14 which give sufficient flexibility to the shim. The shim is constructed so that it can adapt itself to any deviations while still retaining a certain degree of stiffness. In the preferred embodiment one side of the shim contains five ridges 12 extending the full length thereof, while the other contains four ridges 13, also extending the full length thereof in the same direction as the ridges 12, the ridges 13 are located between the upper ridges 12 and are interconnected by the webs 14. This construction and arrangement effectively provides three-point contact with the parallel fuel rods 10 as shown in FIG. 3. Thus, taking any three consecutive ridges comprising two from one side and one from the other side, it is seen that three-point contact is provided between adjacent parallel rods. This is true regardless of the spacing between each row of rods. The shim is constructed of a material so that it has a certain amount of resiliency, which enables the shim to self-lock in position between the fuel rods.

To position the shims in the fuel assembly, they are forced between each of the parallel rows of the fuel rods 10 in the same direction. The flexible or resilient nature of the shim allows the ridges to depress slightly at the point of contact with the fuel rods. This feature of the present invention is shown by the depressions 15 in FIG. 1. The self-locking nature of the shim prevents it from becoming dislodged during transportation of the fuel assembly. By positioning adjacent shipping shim arrays in perpendicular relationship, the necessary restraint of the rods is obtained in all directions. The shims are designed to be of such a length that they extend to a point substantially coplanar with the extremities of the fuel assembly. Removal of the shims is readily obtained merely by pushing the shims out from between the parallel rows of rods. The general disposition of the shims relative to the fuel rods longitudinal axis is perpendicular in two directions.

A typical shipping shim constructed according to this invention may have a width of about 2.62 inches and a length of about 5¼ inches. The typical radius of the ridge 12.13 may be three thirty-seconds inch, with five-sixteenths inch between adjacent ridge centers. The shim may have a typical distance of five-eighths inch between the center of adjacent ridge located on the same side. A typical thickness of the webs per se is 0.023 inches with an overall depth (between the ridges) of 0.170 inches.

It will be appreciated from the foregoing that there has been provided a novel and improved shim for use in the shipment of fuel assemblies or other like members containing parallel arrays of rods which require restraint from flexing during such shipment. It should be understood, however, that the construction and arrangement herein illustrated and described is intended to be representative of only a preferred embodiment and that certain changes readily may be made therein without departing from the clear teachings and scope of the present invention. Accordingly, reference should be made to the following appended claims in determining the full scope of this invention.

What is claimed is:

1. In a fuel assembly for a nuclear reactor comprising a plurality of elongated fuel elements having their longitudinal axes substantially parallel and arranged in spaced rows with each of said rows comprising more than one of said fuel elements, the improvement which comprises removable shim means extending along the length of said fuel assembly for preventing flexing of said fuel elements during shipment of said fuel assembly, said shim means comprising a first plurality of individual members having opposed ridged surfaces positioned between first adjacent rows of said parallel fuel elements with the ridged surfaces thereof extending in the same direction as said first adjacent rows and a second plurality of individual members having opposed ridged surfaces independent of said first plurality of members and positioned between second adjacent rows of said parallel fuel elements which rows extend in a direction perpendicular to that of said first adjacent rows and the ridged surfaces thereof extend in the same direction as said second adjacent rows, each of said first and second plurality of individual members being constructed and arranged to removably self-lock in position between said adjacent rows of said fuel elements, said first and second plurality of individual members being adjacent each other in alternating fashion for substantially the length of said fuel assembly.

2. In a fuel assembly according to claim 1, wherein each of said members includes a plurality of resilient upper and lower spaced ridges.

3. In a fuel assembly according to claim 2, wherein each of said ridges on opposing surfaces of each of said members are alternately spaced to provide multiple-point contact with the adjacent fuel elements.

4. In a fuel assembly according to claim 3, wherein adjacent ones of said ridges of each of said members are interconnected by flexible webs.

5. In a fuel assembly according to claim 1, wherein each of said members comprises a plurality of depressible parallel ridges on said opposed surfaces thereof for contacting said fuel elements and permitting said members to removably self-lock in position between said adjacent parallel rows of said fuel elements.

6. A shim comprising a flexible rectangular member having opposed surfaces each of which includes a plurality of transversely spaced ridges with the major axis thereof being parallel, said ridges on one of said surfaces being alternately spaced between consecutive ridges on the other of said surfaces for providing multiple-point contact when disposed in operable position between parallel rows of elongated elements, said ridges being depressible at the point of contact with said elements to permit said shim to self-lock in place when disposed in operable position between said elements.

7. A shim according to claim 6, wherein said ridges extend for the full length of said member.

8. A shim according to claim 6 wherein said member is elongated.

9. A shim according to claim 6 which is made of polyethylene.

10. A method for preventing flexing of parallel rows of spaced elongated fuel elements of a nuclear fuel assembly during shipment, comprising the steps of:

a. positioning a first plurality of self-locking at least partially depressible members having opposed contact surfaces between first rows of said fuel elements in a first direction perpendicular to the length thereof for surface contact between said members and said fuel elements in the rows adjacent thereto;

b. positioning a second plurality of self-locking at least partially depressible members having opposed contact surfaces between second rows of said fuel elements adjacent to said first plurality of members with the contact surfaces of said second plurality of members extending laterally therefrom in the longitudinal direction and in a direction perpendicular to the length of said fuel elements;

c. positioning said first and second plurality of said members along substantially the entire length of said elongated fuel elements.

11. In a fuel assembly according to claim 1, wherein each of said members in said first plurality and said second plurality comprises an elongated rectangular configuration.

12. In a fuel assembly according to claim 1, wherein each of said members of said first plurality and said second plurality extends in its respective direction to the extremities of said fuel assembly so as to be substantially coplanar therewith.

13. In a fuel assembly according to claim 1, wherein each of said members of said first plurality and said second plurality comprises laterally spaced parallel ridges on said opposed surfaces for multi-point contact with said fuel elements contained in adjacent rows.

14. In a fuel assembly for a nuclear reactor comprising a plurality of elongated fuel elements having their longitudinal axes substantially parallel and arrayed in spaced adjacent rows with each of said rows comprising more than one of said fuel elements and a first plurality of said rows extending in a first direction and a second plurality of said rows extending in a direction perpendicular to said first direction, the improvement which comprises: removable shim means extending along the length of said fuel assembly for preventing flexing of said elements during shipment thereof, said shim means comprising a plurality of individual rectangular at least partially resilient members having opposed fuel element contact surfaces with laterally spaced parallel ridges thereon extending the full length of said members, a first plurality of said members positioned between said first plurality of rows with the opposed surfaces thereof extending in said first direction, and a second plurality of members similar to and independent of said first members positioned between said second plurality of rows with the opposed surfaces thereof extending in said second direction, said first and second plurality of said members being constructed and arranged to removably self-lock in position between said rows of said fuel elements.

* * * * *